US012604877B1

(12) United States Patent　　　(10) Patent No.:　US 12,604,877 B1

Crane et al.　　　　　　　　　　(45) Date of Patent:　　Apr. 21, 2026

(54) ICE FISHING TIP-UP DEVICE

(71) Applicants:Morgan Crane, Sprucedale (CA);
　　　　　　　Tyler Crane, Sprucedale (CA)

(72) Inventors:　Morgan Crane, Sprucedale (CA);
　　　　　　　Tyler Crane, Sprucedale (CA)

( * ) Notice:　Subject to any disclaimer, the term of this
　　　　　　patent is extended or adjusted under 35
　　　　　　U.S.C. 154(b) by 0 days.

(21) Appl. No.: 19/172,778

(22) Filed:　　Apr. 8, 2025

(51) Int. Cl.
　　　*A01K 97/01*　　　(2006.01)
　　　*A01K 97/12*　　　(2006.01)
(52) U.S. Cl.
　　　CPC .............. *A01K 97/01* (2013.01); *A01K 97/12*
　　　　　　　　　　　　　　　　　　(2013.01)
(58) Field of Classification Search
　　　CPC ....... A01K 97/01; A01K 97/12; A01K 97/125
　　　See application file for complete search history.

(56)　　　　　　References Cited

U.S. PATENT DOCUMENTS

| 434,426 | A | * | 8/1890 | Costellow | ............ | A01K 97/125 |
| | | | | | | 116/303 |
| 2,496,090 | A | | 1/1950 | Grohs | | |
| 2,636,303 | A | * | 4/1953 | Feigley | .................. | A01K 97/01 |
| | | | | | | 43/17 |
| 2,651,875 | A | * | 9/1953 | Brockman | ............. | A01K 97/01 |
| | | | | | | 43/17 |
| 2,674,426 | A | * | 4/1954 | Hiles | ...................... | A01K 97/10 |
| | | | | | | 248/533 |
| 2,693,660 | A | * | 11/1954 | Nebergall | ............. | A01K 97/10 |
| | | | | | | 248/514 |

| 2,785,494 | A | * | 3/1957 | Eaton | ................... | A01K 97/125 |
| | | | | | | 43/17 |
| 2,926,874 | A | * | 3/1960 | Hahn | ...................... | A01K 97/10 |
| | | | | | | 248/533 |
| 2,996,605 | A | * | 8/1961 | Kinsey | ................. | A01K 97/125 |
| | | | | | | 362/109 |
| 3,058,249 | A | * | 10/1962 | Krusbe | .................. | A01K 97/12 |
| | | | | | | 43/16 |
| 3,060,616 | A | * | 10/1962 | Woodley | ................ | A01K 97/01 |
| | | | | | | 43/17 |
| 3,147,563 | A | * | 9/1964 | Molter | ................... | A01K 97/01 |
| | | | | | | 43/17 |
| 3,213,561 | A | * | 10/1965 | Roemer | ................. | A01K 97/01 |
| | | | | | | 43/17 |
| 3,407,528 | A | | 10/1968 | Lenning | | |
| 3,568,352 | A | * | 3/1971 | Hill | ...................... | A01K 91/065 |
| | | | | | | 43/17 |

(Continued)

FOREIGN PATENT DOCUMENTS

| CA | 2740143 | A1 | * | 11/2011 | ............. | A01K 97/01 |
| EP | 0312380 | A1 | * | 4/1989 | ........... | A01K 97/125 |

(Continued)

*Primary Examiner* — Morgan T Jordan

(74) *Attorney, Agent, or Firm* — Kyle A. Fletcher, Esq.

(57)　　　　　　　ABSTRACT

The ice fishing tip-up device is used in ice fishing. The ice
fishing tip-up device is adapted for use with a fishing line.
The ice fishing tip-up device attaches to the fishing line such
that the ice fishing tip-up device indicates when a fish
applies a tension to the fishing line. The ice fishing tip-up
device incorporates a gusset plate structure, an indicator
plate structure, and a capture hook structure. The gusset
plate structure attaches to the indicator plate structure. The
capture hook structure secures the fishing line to the indi-
cator plate structure. The application of a tension to the
fishing line rotates the indicator plate structure relative to the
gusset plate structure.

8 Claims, 5 Drawing Sheets

(56)                    References Cited

U.S. PATENT DOCUMENTS

| | | | | |
|---|---|---|---|---|
| 3,724,115 | A * | 4/1973 | Derie | A01K 97/10 43/21.2 |
| 3,739,514 | A * | 6/1973 | Odney | A01K 97/01 43/17 |
| 4,250,649 | A * | 2/1981 | Harrington | A01K 97/125 43/16 |
| 4,285,154 | A * | 8/1981 | Grahl | A01K 97/01 43/17 |
| 4,633,608 | A * | 1/1987 | Savarino | A01K 97/125 43/17 |
| 4,837,965 | A * | 6/1989 | True | A01K 97/01 43/17 |
| 4,887,777 | A * | 12/1989 | Rasmussen | A01K 97/12 242/390.8 |
| 5,076,001 | A * | 12/1991 | Coon | A01K 97/11 43/16 |
| 5,115,590 | A * | 5/1992 | Larson | A01K 97/12 43/25 |
| 5,367,815 | A * | 11/1994 | Liou | A01K 97/10 248/528 |
| 5,682,703 | A * | 11/1997 | Corbiere | A01K 97/125 43/25 |
| 5,778,592 | A * | 7/1998 | Malmberg | A01K 97/10 43/21.2 |
| 5,903,998 | A * | 5/1999 | Hawkins | A01K 97/11 43/15 |
| 6,050,020 | A * | 4/2000 | Sizemore | A01K 97/11 43/21.2 |
| 6,446,379 | B1 * | 9/2002 | James | A01K 97/10 43/17 |
| 6,688,033 | B2 * | 2/2004 | Shaff | A01K 97/01 43/17 |
| 6,898,893 | B1 * | 5/2005 | Mukdaprakorn | A01K 97/10 248/538 |
| D533,207 | S | 12/2006 | Kennedy | |
| 8,453,372 | B1 * | 6/2013 | Moe | A01K 97/10 43/17 |
| 8,832,989 | B2 | 9/2014 | Martinella | |
| 9,642,350 | B2 * | 5/2017 | Aiello | A01K 97/12 |
| 9,955,681 | B1 * | 5/2018 | Yang | A01K 97/01 |
| 10,631,530 | B1 | 4/2020 | Peterman | |
| 11,700,841 | B1 | 7/2023 | Brown | |
| 2002/0139033 | A1 * | 10/2002 | Scherg | A01K 97/01 43/17 |
| 2003/0172577 | A1 * | 9/2003 | Allen | A01K 97/125 43/17 |
| 2003/0208947 | A1 * | 11/2003 | Cramer | A01K 97/125 43/17 |
| 2006/0179706 | A1 * | 8/2006 | Weber | A01K 97/10 43/21.2 |
| 2009/0272022 | A1 | 11/2009 | Grega | |
| 2010/0139149 | A1 * | 6/2010 | Carignan | A01K 97/12 43/17.1 |
| 2013/0055621 | A1 * | 3/2013 | Fong | A01K 97/10 43/21.2 |
| 2013/0255130 | A1 * | 10/2013 | Baugh | A01K 97/12 43/4.5 |
| 2014/0068995 | A1 * | 3/2014 | Galbraith | A01K 97/12 43/17 |
| 2014/0090287 | A1 * | 4/2014 | Olson | A01K 97/01 43/17 |
| 2017/0265446 | A1 * | 9/2017 | Dungan | A01K 99/00 |
| 2025/0017189 | A1 * | 1/2025 | Wallace | A01K 97/10 |

FOREIGN PATENT DOCUMENTS

| | | | | | |
|---|---|---|---|---|---|
| GB | 2214044 | A * | 8/1989 | | A01K 97/125 |
| KR | 0131737 | Y1 * | 12/1998 | | A01K 97/10 |
| KR | 20200131481 | A * | 11/2020 | | A01K 97/10 |
| WO | WO-9415458 | A1 * | 7/1994 | | A01K 97/12 |

* cited by examiner

ICE FISHING TIP-UP DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The ice fishing tip-up device is used in ice fishing. The ice fishing tip-up device is adapted for use with a fishing line. The ice fishing tip-up device attaches to the fishing line such that the ice fishing tip-up device indicates when a fish applies a tension to the fishing line. The ice fishing tip-up device comprises a gusset plate structure, an indicator plate structure, and a capture hook structure. The gusset plate structure attaches to the indicator plate structure. The capture hook structure secures the fishing line to the indicator plate structure. The application of a tension to the fishing line rotates the indicator plate structure relative to the gusset plate structure.

These together with additional objects, features and advantages of the ice fishing tip-up device will be readily apparent to those of ordinary skill in the art upon reading the following detailed description of the presently preferred, but nonetheless illustrative, embodiments when taken in conjunction with the accompanying drawings.

In this respect, before explaining the current embodiments of the ice fishing tip-up device in detail, it is to be understood that the ice fishing tip-up device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ice fishing tip-up device.

It is therefore important that the claims be regarded as including such equivalent construction insofar as they do not depart from the spirit and scope of the ice fishing tip-up device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
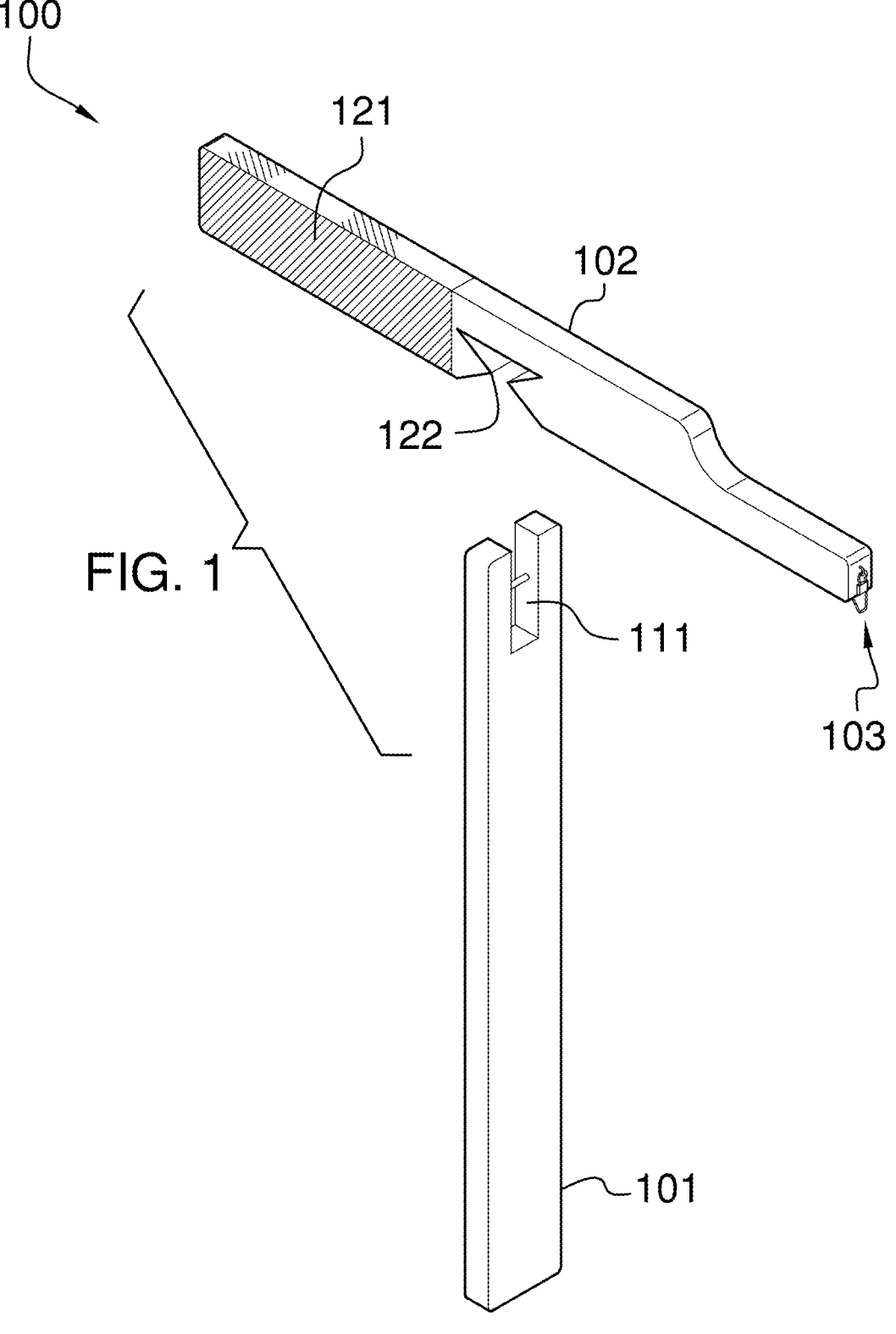
FIG. 1 is an exploded view of an embodiment of the disclosure.
Figure 2:
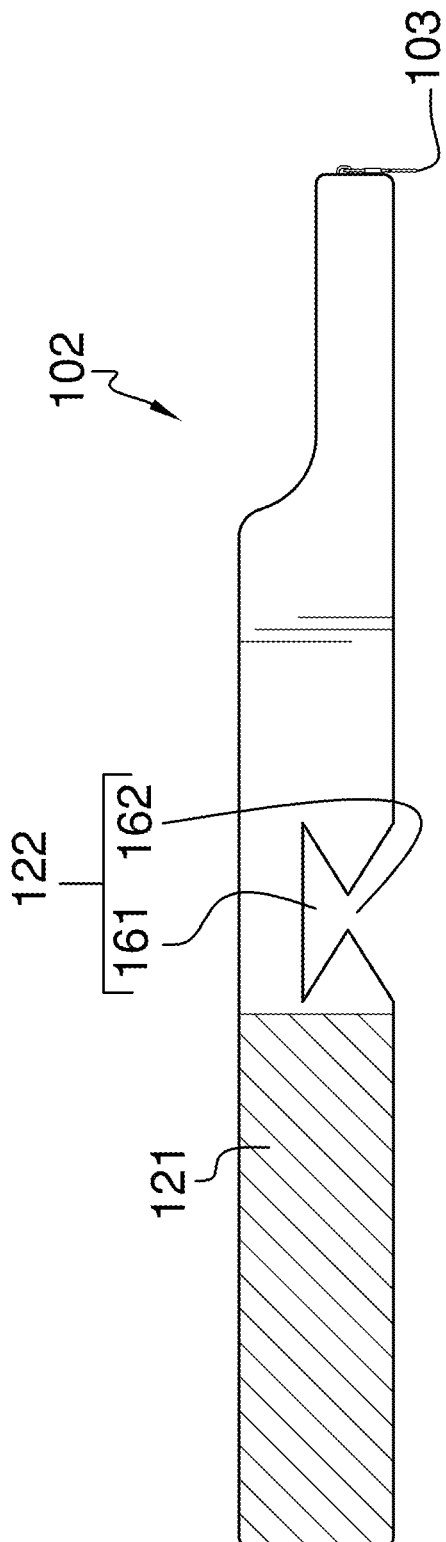
FIG. 2 is a detail view of an embodiment of the disclosure.
Figure 3:
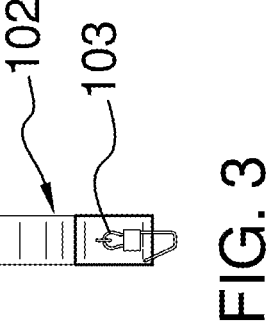
FIG. 3 is a detail view of an embodiment of the disclosure.
Figure 4:
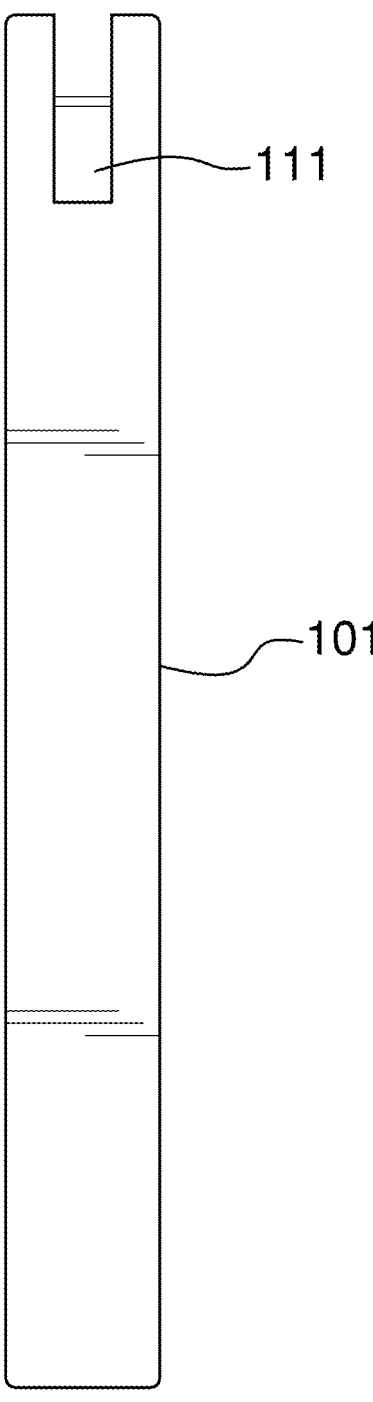
FIG. 4 is a detail view of an embodiment of the disclosure.
Figure 5:
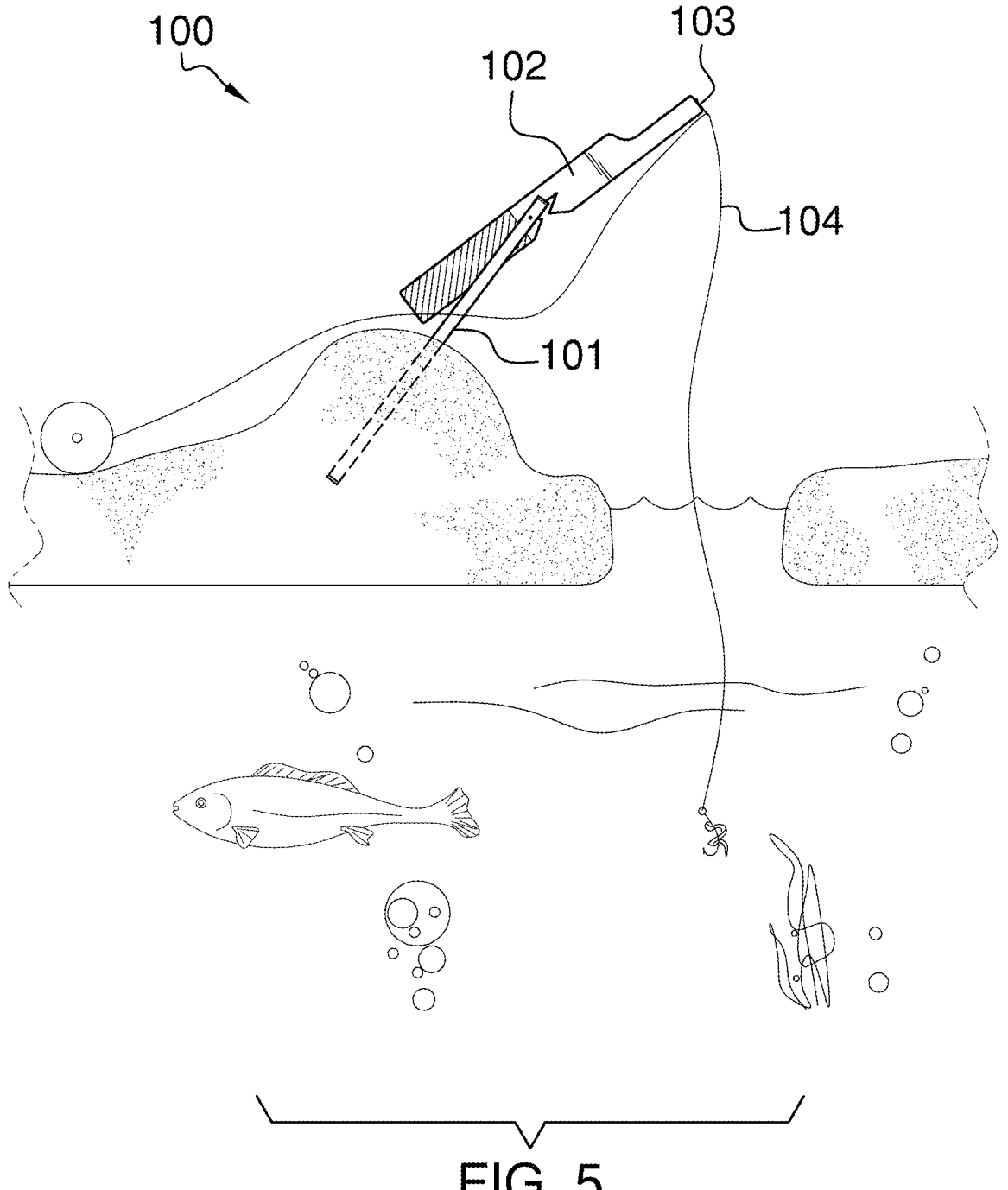
FIG. 5 is an in-use view of an embodiment of the disclosure.
Figure 6:
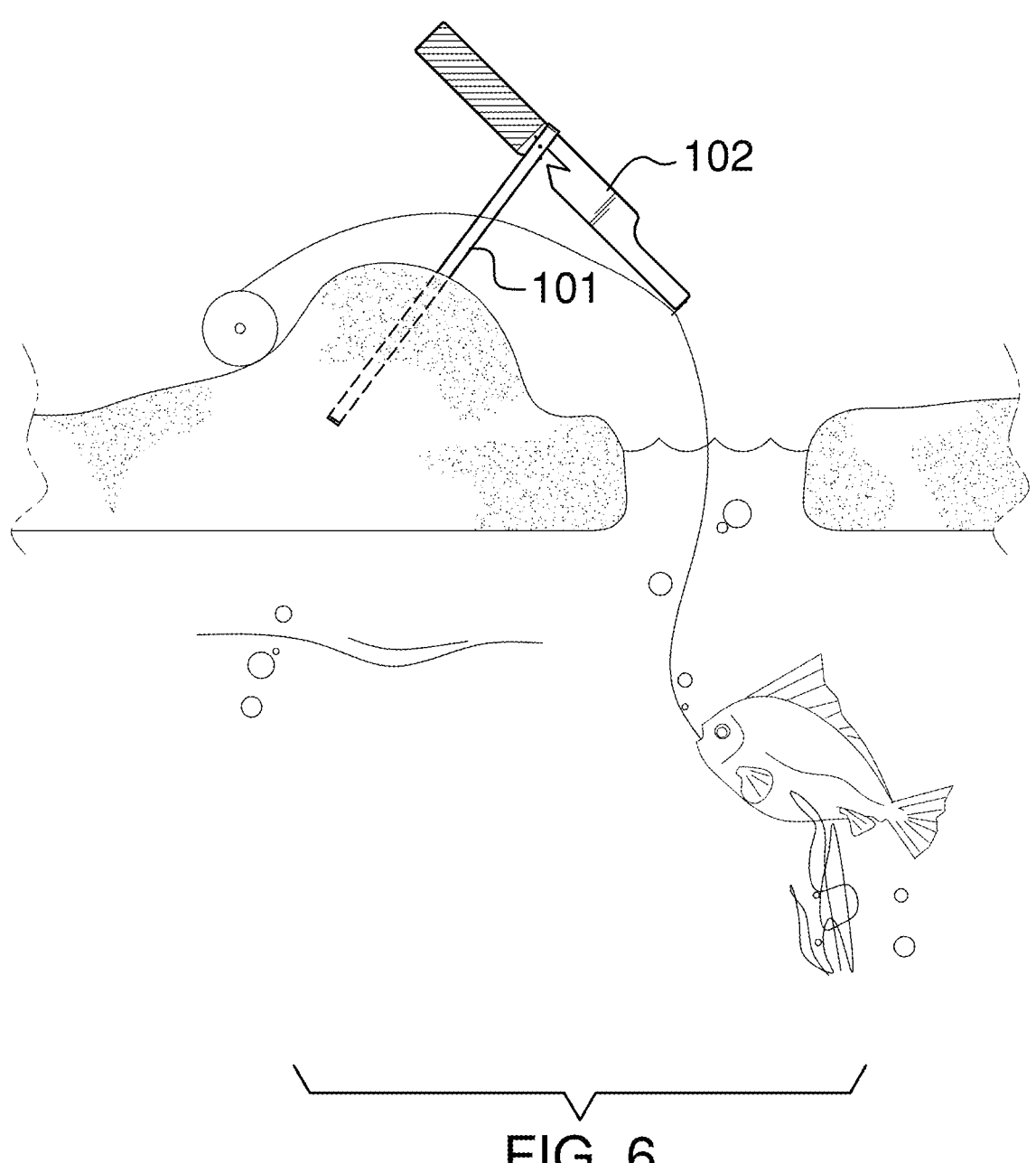
FIG. 6 is an in-use view of an embodiment of the disclosure.

Detailed reference will now be made to one or more potential embodiments of the disclosure, which are illustrated in FIGS. 1 through 6.

The ice fishing tip-up device 100 (hereinafter invention) is used in ice fishing. The invention 100 is adapted for use with a fishing line 104. The invention 100 attaches to the fishing line 104 such that the invention 100 indicates when a fish applies a tension to the fishing line 104. The invention comprises a gusset plate structure 101, an indicator plate structure 102, and a capture hook structure 103. The gusset plate structure 101 attaches to the indicator plate structure 102. The capture hook structure 103 secures the fishing line 104 to the indicator plate structure 102. The application of a tension to the fishing line 104 rotates the indicator plate structure 102 relative to the gusset plate structure 101.

The fishing line 104 is a monofilament cord. The fishing line 104 is adapted for use in capturing fish.

The gusset plate structure 101 is a disk shaped structure. The congruent ends of the gusset plate structure 101 have a rectangular shape. The gusset plate structure 101 is a load bearing structure. The gusset plate structure 101 mounts into a anchoring structure. The gusset plate structure 101 projects away from the anchoring structure to form a gusset structure. The indicator plate structure 102 attaches to the gusset plate structure 101 such that the indicator plate structure 102 rotates relative to the gusset plate structure 101. The gusset plate structure 101 further comprises a gusset notch 111.

The gusset notch 111 is a notch that is formed in the gusset plate structure 101. The gusset notch 111 is a negative space that is formed through the congruent ends of the disk structure of the gusset plate structure 101. The gusset notch forms a u shaped structure. The free end of the first arm of the u-shaped structure that forms the gusset notch 111 is located on a perimeter edge of the gusset plate structure 101 that is parallel to the minor axis of the gusset plate structure

101. The free end of the second arm of the u-shaped structure that forms the gusset notch 111 is located on a perimeter edge of the gusset plate structure 101 that is parallel to the minor axis of the gusset plate structure 101.

The indicator plate structure 102 is a disk shaped structure. The congruent ends of the indicator plate structure 102 have a rectangular shape. The indicator plate structure 102 is a load bearing structure. The indicator plate structure 102 attaches to the gusset plate structure 101 such that the indicator plate structure 102 rotates relative to the gusset plate structure 101. The indicator plate structure 102 attaches to the swivel hook structure 103 such that a tension applied to the swivel hook structure 103 rotates the indicator plate structure 102. The rotation of the indicator plate structure 102 relative to the gusset plate structure 101 provides a visual indication that a fish has been tethered to the fishing line 104. The indicator plate structure 102 comprises an indicator disk structure 121 and an indicator notch structure 122.

The indicator disk structure 121 is a substructure of the indicator plate structure 102. The indicator disk structure 121 presents a color intended to catch the attention of a viewer. The color presented by the indicator disk structure 121 visually highlights the rotation of the indicator plate structure 102 relative to the gusset plate structure 101.

The indicator notch structure 122 is a notch that is formed in the gusset plate structure 101. The indicator notch structure 122 is a negative space that is formed through the congruent ends of the disk structure of the gusset plate structure 101. The indicator notch structure 122 has a roughly hourglass shape. The indicator notch structure 122 creates an opening in the perimeter edge of the indicator plate structure 102 that is parallel to the major axis of the indicator plate structure 102. The gusset notch 111 of the gusset plate structure 101 inserts into the indicator notch structure 122 to form a bi-stable structure. The load of the indicator plate structure 102 is supported within the gusset notch 111 such that the position of the indicator notch structure 122 within the gusset notch 111 has two stable states. The application of a tension on the fishing line 104 causes the indicator plate structure 102 to shift between the two stable states of the indicator plate structure 102. The indicator notch structure 122 further comprises an interior trapezoid substructure 161 and an exterior trapezoid substructure 162.

The interior trapezoid substructure 161 is a trapezoid shaped structure. The interior trapezoid substructure 161 forms a negative space through the congruent ends of the indicator plate structure 102. The interior trapezoid substructure 161 is formed with a truncated apex structure. By a truncated apex structure is meant that the perimeter edge of the trapezoid shape of the interior trapezoid substructure 161 is fully contained in the negative hourglass shape of the indicator notch structure 122.

The exterior trapezoid substructure 162 is a trapezoid shaped structure. The exterior trapezoid substructure 162 forms a negative space through the congruent ends of the indicator plate structure 102. The exterior trapezoid substructure 162 is formed with a truncated apex structure. By a truncated apex structure is meant that the perimeter edge of the trapezoid shape of the exterior trapezoid substructure 162 is fully contained in the negative hourglass shape of the indicator notch structure 122. The truncated apex structure of the exterior trapezoid substructure 162 aligns with the truncated apex structure of the interior trapezoid substructure 161 to form the hourglass shape of the indicator notch structure 122. By an open base structure is meant that the open base structure is the perimeter edge of the exterior trapezoid substructure 162 that forms the opening in the perimeter edge of the indicator plate structure 102.

The swivel hook structure 103 is a hook. The swivel hook structure 103 physically attaches to the disk structure of the indicator plate structure 102. The swivel hook structure 103 receives the fishing line 104 such that the swivel hook structure 103 secures the fishing line 104 to the indicator plate structure 102. The swivel hook structure 103 is positioned the application of a tension to the fishing line 104 will provide the indicator plate structure 102 with the motive force necessary to rotate the indicator plate structure 102 relative to the gusset plate structure 101. The swivel hook structure 103 is formed with a swivel that prevents the fishing line 104 from twisting as the fishing line 104 transmits a tension to the indicator plate structure 102.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Associate: As used in this disclosure, the term associate is used to describe a relationship between a first object and a second object. The use of the term associated implies both: a) that the first object works with the second object in order to accomplish a task necessary for the implementation of the invention (such as joining two objects together); and, b) the relationship remains stable through the accomplishment of the task. By stable is meant that neither the first object or the second object are intended to be interchanged with a third object during the use of the invention.

Bridge: As used in this disclosure, a bridge refers to a load bearing structure that attaches a first object and to a second object such that a load bearing path is formed between the first object and the second object. The verb "to bridge" means to establish a connection (or remove a disconnection) between a first object and a second object.

Cant: As used in this disclosure, a cant is an angular deviation from one or more reference lines (or planes) such as a vertical line (or plane) or a horizontal line (or plane).

Cargo: As used in this disclosure, cargo refers to one or more objects that are intended to be transported using a vehicle. The term freight is a synonym for cargo.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned.

When the center axes of two cylinder, prism or pyramidal structures do not share the same line they are said to be offset.

Center, Major, Minor, and Thickness Dimensions: As used in this disclosure, the center dimension, the major dimension, the minor dimension, and the thickness each refer to the span of a length associated with a structure selected from the group consisting of a prism structure and a disk structure. The center dimension is the span of the length of the center axis of the selected structure. The thickness is an alternate name given to the center dimension when the selected structure is a disk structure. The major dimension is the span of the length of the major axis of the perimetrical boundary that contains the selected structure. The minor dimension is the span of the length of the minor axis of the perimetrical boundary that contains the selected structure. The terms center dimension, the major dimension, the minor dimension, and the thickness are also used to describe one or more linear axes of direction associated with the selected structure.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, yarn, and rope are synonyms for cord. This definition further includes textile webbings as a type of cord. The free end of a cord refers to the region of the cord that is proximal to the congruent end of the prism shape of the cord. A fixed end of a cord refers to a free end of a cord that has been bound to an anchor point.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Exterior: As used in this disclosure, the exterior is used as a relational term that implies that an object is not contained within the boundary of a structure or a space.

Fishing Line: As used in this disclosure, a fishing line is a monofilament cord to which a hook is attached for the purpose of capturing a fish.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Game Animal: As used in this disclosure, a game animal is an animal that is targeted by a hunter or fisherperson during hunting or fishing activities.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Gusset: As used in this disclosure, a gusset is an angled structural member used to form a portion of the load path of a section of a framework. By angled is meant that the gusset is neither parallel nor perpendicular to the force of gravity.

Hook: As used in this disclosure, a hook is an object that is curved or bent at an angle such that items can be hung on or caught by the object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hourglass Shape: As used in this disclosure, the hourglass shape refers to roughly prism-shaped structure wherein the width of the lateral face of the prism varies such the lateral face narrows between the two ends of the prism to a width less than the diameter of each of the ends of the prism. The hourglass shape is known for a characteristic wide-narrow-wide appearance. In two dimensions, the hourglass shape will look like the cross sectional face of the prismatic bifurcation of the prism structure that forms the three dimensional hourglass shape.

Interior: As used in this disclosure, the interior is used as a relational term that implies that an object is contained within the boundary of a structure or a space.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load of an Object: As used in this disclosure, the term load of an object refers to an object that is inserted into a load path. The load of an object refers to the sum of the forces (including the force of gravity) that are applied to the object.

Load Path: As used in this disclosure, a load path refers to a chain of one or more structures that transfers a load generated by a raised structure or object to a foundation, supporting surface, or the earth.

Major and Minor Axes: As used in this disclosure, the major and minor axes refer to a pair of perpendicular axes that are defined within a structure. The length of the major axis is always greater than or equal to the length of the minor axis. The major axis forms the longest symmetric bifurcation of a structure selected from the group consisting of: a) the structure; or, b) the perimetrical boundary of the structure. The major and minor axes intersect at the center of the structure. The major axis is always parallel or perpendicular to an edge of a rectangular or rectilinear structure.

Multi-Stable: As used in this disclosure, an object or system is considered multi-stable when the object or system has more than one set of (non-trivial) conditions within which the object or system will exhibit stability. An object or system with two such stable "states" is called bi-stable.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Notch: As used in this disclosure, a notch is: 1) an indentation or negative space formed in an edge; or 2) a cavity or aperture formed within a surface.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Pickup Truck: As used in this disclosure, a pickup truck is a vehicle having an enclosed cab and an open body comprising low sides and a tailgate that is powered by an internal combustion engine. A pickup truck is further defined with a bed, a tailgate, a left sidewall, a right sidewall, and an end wall. The bed is a pan shaped containment space that is bounded by the tailgate, the left sidewall, the right sidewall, and the end wall. The bed is used for transporting cargo.

Pivot: As used in this disclosure, a pivot is a rod or shaft around which an object rotates or swings.

Posterior: As used in this disclosure, posterior is a term that is used to refer to the side of an object that is distal or in the opposite direction of the anterior side. When comparing two items, the posterior item is the item that is distal from the anterior of the object.

Pressure: As used in this disclosure, pressure refers to a measure of force per unit area.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Prismatic Bifurcation: As used in this disclosure, a prismatic bifurcation refers to the bifurcation of a prism structure by a plane wherein the bifurcating plane does not intersect the center axis of the prism structure. In a prismatic bifurcation, the center axis can lie on the bifurcating plane. In this instance, the prismatic bifurcation is said to form a horizontal segment. A structure formed with a prismatic bifurcation is known as a bifurcated prismatic structure.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Stable: As used in this disclosure, stable is an adjective that is applied to the state an object or system wherein the stable state of the object or system will not change unless: 1) a force is applied to or removed from the object or system; or, 2) a change is made to the energy stored within the system. Objects in a stable state may informally be referred to as in equilibrium.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Swivel: As used in this disclosure, a swivel is a device used in fishing to prevent a fishing line from twisting during use.

Tension: As used in this disclosure, tension refers to a force applied to an object such that the force will increase the span of length of the object along the direction of the force.

Trapezoid: As used in this disclosure, a trapezoid is a quadrilateral with one pair of parallel sides. An isosceles trapezoid is a trapezoid for which a line exists that: 1) intersects opposite sides of the trapezoid; and, 2) bisects the trapezoid into two congruent shapes or structures.

U-Shaped Structure: As used in this disclosure, a U-shaped structure is a type of offset composite prism structure. The U-shaped structure is a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of length of the first arm roughly equals the span of length of the second arm. A non-Euclidean U-shaped structure refers to a U-shaped structure with a cross beam that is forms as a non-Euclidean prism. An illiterate U-shaped structure refers to a U-shaped structure wherein the span of the length of the first arm differs from the span of the length of the second arm by more than 10 percent. A guided U-shaped structure refers to a U-shaped structure that has: a) the first arc formed by the interior cant formed between the first arm and the crossbeam is greater than or equal to 100 degrees; b) a second arc formed by the interior cant formed between the second arm and the crossbeam is greater than or equal to 100 degrees; and, c) the first arc and the second arc are roughly equal.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate 13 definition or definitions are not obvious, the second option should be used in interpreting the specification. Unless specifically noted in this disclosure, the vertical direction is always perpendicular to the horizontal direction.

Water: As used in this disclosure, water (CAS 7732-18-5) is a molecule comprising two hydrogen atoms and one oxygen molecule. The phase of water at normal temperature and pressure is liquid. As used in this disclosure, the definition of water is expanded to include dilute water-based solutions of salts and ionic structures using water as the solvent. Water in a gas phase is often referred to as steam. Water in a solid phase is often referred to as ice. Snow refers to a bulk solid form of ice.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An ice fishing tip-up device comprising:
a gusset plate structure, an indicator plate structure, and a capture hook structure;
wherein the ice fishing tip-up device is configured to attach to a fishing line such that the ice fishing tip-up device indicates when a fish applies a tension to the fishing line;
wherein the gusset plate structure attaches to the indicator plate structure;
wherein the capture hook structure secures the fishing line to the indicator plate structure;
wherein the application of a tension to the fishing line rotates the indicator plate structure relative to the gusset plate structure;
wherein the indicator plate structure comprises an indicator portion and an indicator notch structure;

wherein a gusset notch of the gusset plate structure inserts into the indicator notch structure to form a bi-stable structure with two stable states;
wherein the load of the indicator plate structure is supported within the gusset notch such that the position of the indicator notch structure within the gusset notch has the two stable states
wherein the application of a tension on the fishing line causes the indicator plate structure to shift between the two stable states of the indicator plate structure; and
wherein the indicator notch is an hourglass shape which provides the two stable states.

2. The ice fishing tip-up device according to claim 1 wherein the gusset plate structure mounts into an anchoring structure.

3. The ice fishing tip-up device according to claim 2 wherein congruent ends of the gusset plate structure have a rectangular shape;
wherein the gusset plate structure projects away from the anchoring structure to form a gusset structure.

4. The ice fishing tip-up device according to claim 3;
wherein congruent ends of the indicator plate structure have a rectangular shape;
wherein the indicator plate structure is a load bearing structure;
wherein the indicator plate structure attaches to the capture hook structure such that a tension applied to the capture hook structure rotates the indicator plate structure;
wherein the rotation of the indicator plate structure relative to the gusset plate structure provides a visual indication that a fish has been tethered to the fishing line.

5. The ice fishing tip-up device according to claim 4 wherein the capture hook structure is a hook;
wherein the capture hook structure physically attaches to the indicator plate structure
wherein the capture hook structure receives the fishing line such that the capture hook structure secures the fishing line to the indicator plate structure;
wherein the capture hook structure is positioned such that the application of a tension to the fishing line will provide the indicator plate structure with the motive force necessary to rotate the indicator plate structure relative to the gusset plate structure;
wherein the capture hook structure is formed with a swivel that prevents the fishing line from twisting as the fishing line transmits a tension to the indicator plate structure.

6. The ice fishing tip-up device according to claim 5 wherein the gusset notch is a notch that is formed in the gusset plate structure;
wherein the gusset notch is a negative space that is formed through congruent ends of the gusset plate structure;
wherein the gusset notch forms a u shaped structure;
wherein free end of first arm of the u-shaped structure that forms the gusset notch is located on a perimeter edge of the gusset plate structure that is parallel to the minor axis of the gusset plate structure;
wherein free end of second arm of the u-shaped structure that forms the gusset notch is located on a perimeter edge of the gusset plate structure that is parallel to the minor axis of the gusset plate structure.

7. The ice fishing tip-up device according to claim 6 wherein the indicator portion is a substructure of the indicator plate structure;

wherein the indicator portion presents a color intended to catch the attention of a viewer;

wherein the color presented by the indicator portion visually highlights the rotation of the indicator plate structure relative to the gusset plate structure;

wherein the indicator notch structure is a negative space that is formed through congruent ends of the indicator plate structure;

wherein the indicator notch structure creates an opening in the perimeter edge of the indicator plate structure that is parallel to the major axis of the indicator plate structure.

8. The ice fishing tip-up device according to claim 7 wherein the indicator notch structure further comprises an interior trapezoid substructure and an exterior trapezoid substructure;

wherein the interior trapezoid substructure is a trapezoid shaped structure;

wherein the interior trapezoid substructure forms a negative space through congruent ends of the indicator plate structure;

wherein the interior trapezoid substructure is formed with a truncated apex structure;

wherein the exterior trapezoid substructure is a trapezoid shaped structure;

wherein the exterior trapezoid substructure forms a negative space through congruent ends of the indicator plate structure;

wherein the exterior trapezoid substructure is formed with a truncated apex structure;

wherein the perimeter edge of the trapezoid shape of the exterior trapezoid substructure is fully contained in the shape of the indicator notch structure;

wherein the truncated apex structure of the exterior trapezoid substructure aligns with the truncated apex structure of the interior trapezoid substructure to form the hourglass shape of the indicator notch structure.

* * * * *